United States Patent
Pizzi

(10) Patent No.: US 7,143,575 B2
(45) Date of Patent: Dec. 5, 2006

(54) SYSTEM FOR CONTROLLING NOXIOUS EMISSIONS IN EXHAUST GASES OF AN INTERNAL-COMBUSTION ENGINE OF A MOTOR VEHICLE BY MEANS OF AN IR SPECTROPHOTOMETER ON BOARD THE MOTOR VEHICLE

(75) Inventor: Marco Pizzi, Turin (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 54 days.

(21) Appl. No.: 10/976,793

(22) Filed: Nov. 1, 2004

(65) Prior Publication Data

US 2005/0120707 A1    Jun. 9, 2005

(30) Foreign Application Priority Data

Dec. 5, 2003    (IT)    ..................... TO2003A0982

(51) Int. Cl.
*F01N 3/00*    (2006.01)
(52) U.S. Cl. .................... 60/285; 60/274; 60/275; 60/276; 73/118.1; 73/23.37; 701/103; 701/109
(58) Field of Classification Search ............ 60/274, 60/275, 276, 277, 285; 73/118.1, 23.37; 701/103, 105
See application file for complete search history.

(56) References Cited

U.S. PATENT DOCUMENTS 5,545,897 A * 8/1996 Jack ...................... 250/339.13
6,151,547 A * 11/2000 Kumar et al. ............... 701/101
6,237,575 B1 * 5/2001 Lampert et al. ............ 123/520
6,546,594 B1    4/2003 Wills
6,865,472 B1 * 3/2005 Nakamura ................. 701/108

FOREIGN PATENT DOCUMENTS

| DE | 42 35 225 A1 | 6/1994 | |
|---|---|---|---|
| DE | 101 24 235 A1 | 12/2002 | |
| EP | 0 616 200 A1 | 9/1994 | |
| EP | 1 243 902 A1 | 9/2002 | |
| EP | 1548414 A2 * | 6/2005 | ............... 73/118.1 |
| JP | 6 102 39 28 | 2/1986 | |

* cited by examiner

*Primary Examiner*—Binh Q. Tran
(74) *Attorney, Agent, or Firm*—Sughrue Mion, PLLC

(57) ABSTRACT

Noxious emissions present in the exhaust gases of an internal-combustion engine of a motor vehicle are controlled by making use of an IR spectrophotometer provided on board the motor vehicle, for the purpose of obtaining an analysis of all the main components of the exhaust gases of the engine. The IR spectrophotometer is of the type with electrostatic micro-shutters so as to present overall dimensions designed to enable its use on board the motor vehicle.

3 Claims, 4 Drawing Sheets

SYSTEM FOR CONTROLLING NOXIOUS EMISSIONS IN EXHAUST GASES OF AN INTERNAL-COMBUSTION ENGINE OF A MOTOR VEHICLE BY MEANS OF AN IR SPECTROPHOTOMETER ON BOARD THE MOTOR VEHICLE

BACKGROUND OF THE INVENTION

The present invention relates to systems of controlling operation of an internal-combustion engine of a motor vehicle, of the type comprising: one or more electronic control devices that affect the operation of the engine; sensor means for detecting the composition of the exhaust gases of the engine; and an electronic control unit that controls the operation of said electronic devices according to the signals at output from said sensor means.

In an internal-combustion engine of a motor vehicle with electronically controlled injection of petrol, the injector devices associated to the cylinders of the engine are controlled by an electronic control unit depending also, amongst the other parameters, upon the signals emitted by a sensor referred to as "lambda sensor", which measures the content of oxygen of the exhaust gases. By means of experimental measurements, there have been established correlations between the concentration of oxygen and the concentration of the other gases present in the exhaust gases. The signal of the lambda sensor is set in a feedback loop which controls injection.

On the other hand, it should be considered that the interest for the environmental problems and, in particular, the impact of human activities on the environment has led, in the last few years, to the development of more and more stringent legal standards as regards the emissions in the exhaust gases of internal combustion engines of motor vehicles. The evolution of the injection technologies and the introduction of catalytic exhaust-pipe silencers has already reduced considerably the emission of noxious substances into the environment.

SUMMARY OF THE INVENTION

The need to bring about a further reduction in the environmental impact of motor vehicles with internal-combustion engines and, at the same time, a reduction in the fuel consumption may, however, be obtained not only by continuing to use existing technologies, but, above all, via the introduction of a new approach to the problem. In particular, a direct measurement of the concentration not only of oxygen but also of the other gases present in the exhaust gases of the internal combustion engines (such as CO, HC, NO, $H_2O$) would enable a much more accurate characterization of what occurs within the combustion chamber.

The purpose of the present invention is hence to provide a control system for controlling operation of an internal-combustion engine that will meet said need.

With a view to achieving the aforesaid purpose, the subject of the invention is a control system for controlling operation of an internal-combustion engine of a motor vehicle, comprising: one or more electronic control devices, which affect running of the engine; sensor means for detecting the composition of the exhaust gases of the engine; and an electronic control unit, which controls operation of said electronic devices according to the signals at output from said sensor means; said control system being characterized in that said sensor means comprise an infrared (IR) spectrophotometer on board the motor vehicle.

A spectrophotometric analysis of the exhaust gases of an internal-combustion engine constitutes an extremely informative type of measurement, which can be used for improving not only the injection of fuel but also other parameters, such as, for example, control of the opening of the valves in the case of a distribution system with hydraulic control or with electronic control, or else, in the case of diesel engines, the exact amount of burnt gases to be reintroduced into the combustion chamber (a technique referred to as exhaust-gas recirculation—EGR).

The more complete information enables an optimization of the use of the engine not only in different conditions in terms of r.p.m. and torque, but also in different environmental conditions, such as composition, humidity, density and temperature of the air.

It should be borne in mind that spectrophotometry is already used on the testbench for control of the noxious emissions of the exhaust gases of internal-combustion engines, by means of cumbersome and costly equipment which renders use thereof on board the motor vehicle unthinkable, except for the measurements carried out in the research and design stage, and in any case in open loop.

A further purpose of the present invention is hence to provide a control system of the type specified above which will make use of an IR spectrophotometer that will appear particularly suitable, above all from the standpoint of the overall dimensions and costs, to be used on board a motor vehicle in a closed loop with the injection system and/or with the EGR system. Again according to the invention, the aforesaid purpose is achieved thanks to the fact that preferably the IR spectrophotometer used by the system according to the invention is of the type that has formed the subject of the prior European patent application EP 1 243 902 A1, filed in the name of the present applicant. Said spectrophotometer is a low-cost miniaturized IR spectrophotometer which makes use of matrix arrays of electrostatic micro-shutters and of a single photodiode. The electrostatic micro-shutters are controlled in order to address each time, on the single photodiode, only the radiation that it is intended to analyse. The above spectrophotometer can hence do without the use of complex and costly optical transducers, formed by arrays of photodiodes. Photodiode arrays, in addition to being costly, call for periodic calibrations, which are difficult to implement on all motor vehicles at reasonable costs.

According to a further preferred characteristic of the invention, the control system comprises optical guide means made up of optical-fibre means associated to each cylinder of the engine, which enable use of the IR spectrophotometer according to the invention for analysis of the composition of the combustion gases within each cylinder of the engine, so as to enable a more precise and efficient control of running of the engine.

Particularly preferred applications of the present invention are outlined in what follows.

For diesel engines, the invention enables the measurements of the concentration of $NO_x$ in the exhaust gases in order to calculate the amount of burnt gases to recirculate in the combustion chamber together with the air and fuel. It is, in fact, to be noted that, by dosing adequately the EGR in the combustion chamber, it is possible to reduce simultaneously both the fumes and the $NO_x$. Currently this cannot be obtained effectively, there not being available a technology for rapid measurement (10–15 ms) of the concentration of $NO_x$.

For petrol engines, of particular importance is the measurement of unburnt hydrocarbons in order to detect misfiring. Currently, measurement is carried out in a very indirect way and is based on the drop in the r.p.m.;

Once again in the case of petrol engines, the invention enables moreover measurement of the concentration of HC and CO in the first hundred seconds after ignition of the engine, i.e., when the lambda sensor for measurement of the oxygen has not yet reached 300° C. and is not yet active. In current engines, during an initial period after ignition, the control functions without feedback with readily understandable effects on gas emissions.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION OF THE INVENTION

Figure 1:
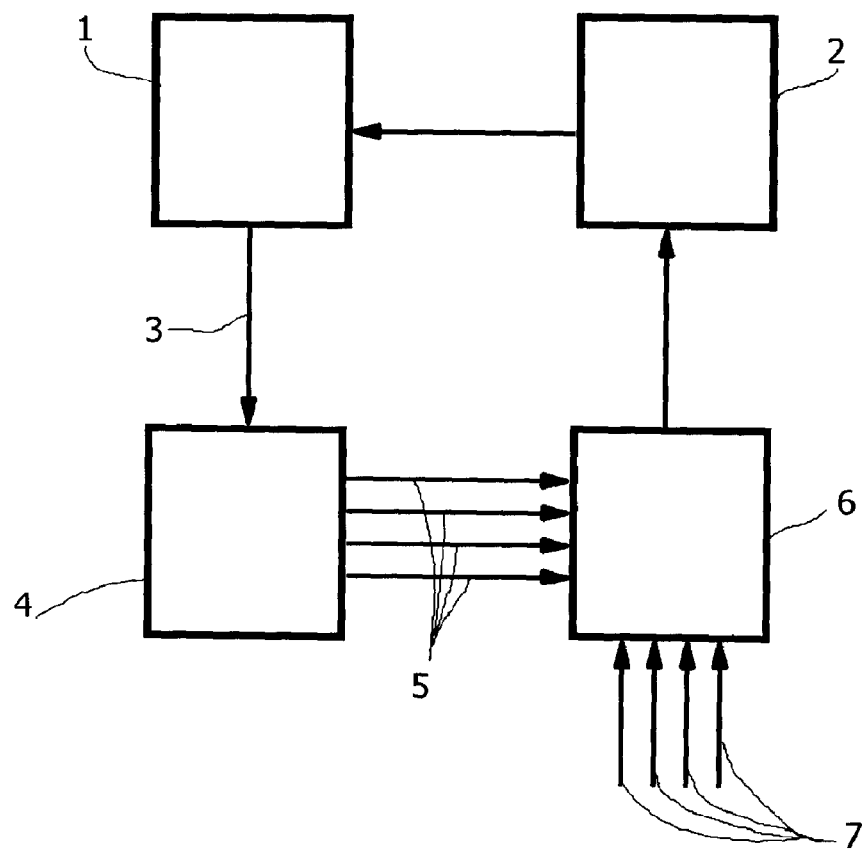
FIG. 1 is a block diagram of the control system according to the invention.
Figure 2:
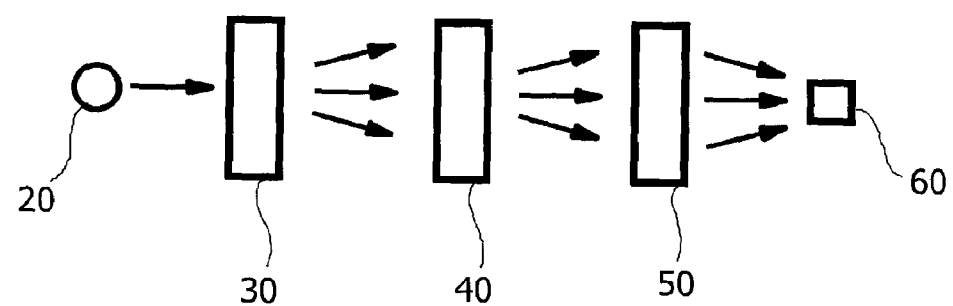
FIG. 2 is a block diagram of the IR spectrophotometer forming the subject of the prior European patent application EP 1 243 902 A1, filed in the name of the present applicant, which finds preferred application in the system according to the invention.

With reference to FIG. 1, the control system according to the invention basically comprises an internal-combustion engine 1, of any known type, which uses one or more electronic control devices that affect running thereof, such as, for example, one or more petrol injectors 2, each associated to a respective cylinder of the engine. The exhaust gases emitted by the internal-combustion engine 1, indicated by the arrow 3 in FIG. 1, are sent to an IR spectrophotometer 4, which is able to detect the composition of said gases, with reference to $CO_x$, HC, $NO_x$, $H_2O$, etc. The spectrophotometer 4 issues at output a set of signals 5, which are sent to an electronic control unit 6, which controls operation of the injectors 2 according to the signals 5 and to a set of further signals 7, which it receives from other sensors associated to the engine or following upon an input from the driver. The IR spectrophotometer 4 is preferably of the type illustrated in FIG. 2. In FIG. 2, the reference number 4 designates, as a whole, the spectrophotometer, which comprises a light source 20 and a separator element 30 of any known type, designed to separate the light beam emitted by the source 20 into the components corresponding to the different wavelengths. Set downstream of the separator device 30 is a device with electrostatic micro-shutters 40. Said device is designed to select a single desired wavelength in the beam emitted by the separator element 30. The radiation emitted is then forced to converge from an optical element 50 onto a single photodiode 60, of any known type, designed to emit at output an electrical signal which is a function of the light energy received.

Figure 3:
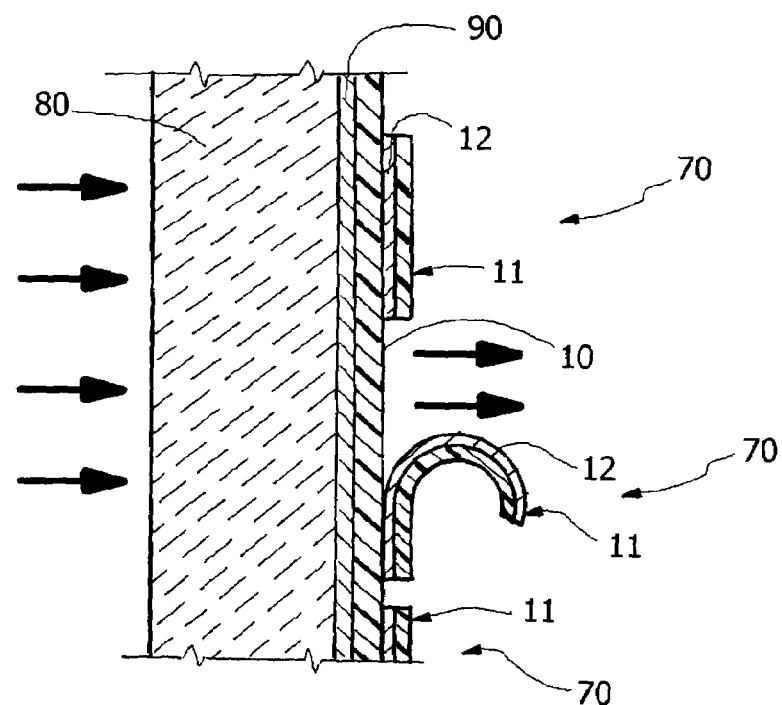
FIG. 3 is a cross-sectional view at an enlarged scale of a detail of the array of electrostatic micro-shutters used in the spectrophotometer of FIG. 2.

FIG. 3 illustrates a detail of an example of embodiment of the device with electrostatic micro-shutters 40. According to said embodiment, in a plane orthogonal to the direction of the light, there is provided an array comprising a plurality of electrostatic micro-shutters 70 with a mobile petal set on top of a substrate 80, which is, for example, made of a transparent material such as germanium, silicon, quartz or glass, and has a thickness of a few millimetres or a few centimetres. Applied on the substrate 80 is a film 90 of conductive transparent material, such as indium tin oxide (ITO), which has the thickness of a few tens or a few hundreds of nanometres and is obtained, for example, by evaporation, spin coating, silk-screen printing, or dipping. The film 90 constitutes a first electrode of the device, which is then coated with a layer of transparent dielectric material, for example, having a thickness of a few micrometres, obtained using techniques similar to those used for the film 90.

Set above the dielectric layer 10 is a matrix of mobile petals 11, each formed, for example, by a dielectric film, to which there is applied a metallized layer 12 acting as second electrode. Each petal 11 has one end anchored to the dielectric layer 10 and, in its undeformed condition, is curled up, so that the light can pass through the respective portion of the substrate. The device comprises electric power supply means for applying a potential difference between the first electrode 90 and the second electrode 12 of a selected petal 11. After the voltage has been applied, the petal uncurls over the dielectric layer 10, adhering electrostatically thereto and consequently preventing passage of the light through the respective portion of the substrate. By controlling the electric power supply to the electrostatic micro-shutters 70 of the matrix array, it is thus possible to select a single desired wavelength in the radiation emitted by the separator element 30. Of course, the electrostatic micro-shutters 70 can also be set in a single aligned series in a plane orthogonal to the direction of passage of the light. Furthermore, the embodiment described above is provided herein only by way of example, it being also possible to adopt any other embodiment whatsoever illustrated in the aforementioned patent application filed in the name of the present applicant.

Once again with reference to the electrostatic micro-shutters, further preferred is an embodiment in which the substrate 8, the electrode 9, and the dielectric 10 have, in the corresponding layers 80, 90, 10, holes made in positions corresponding to each micro-shutter, in such, a way that, in the open condition, there is defined a totally free micro-window which is traversed by light, without the latter undergoing the minimum absorption, and with the further advantage of not requiring adoption of costly materials, such as ITO, in so far as it is not necessary for the electrode 90 to be transparent.

The fundamental characteristic of the IR spectrophotometer illustrated above is that it can make use of a single photodiode with consequent simplification and reduction in costs and overall dimensions. This practically enables use of the IR spectrophotometer to be implemented on board a motor vehicle for controlling the noxious emissions of the exhaust gases emitted by the internal-combustion engine of the motor vehicle.

Figure 4:
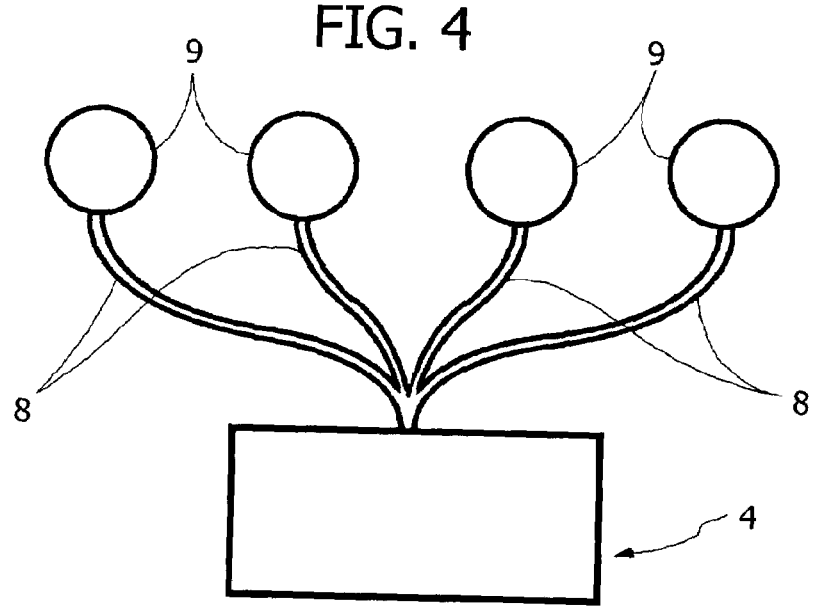
FIG. 4 is a further block diagram of a preferred embodiment of the system according to the invention.

According to a further preferred characteristic (see FIG. 4), the spectrophotometer 4 can receive the optical signals transmitted by optical fibres 8, which are associated to the various cylinders 9 of the engine so as to enable an analysis of the composition of the gases present in each combustion chamber of each cylinder of the engine. In this way, with extremely simple and economic means, a very sophisticated and efficient control of running of the engine is obtained.

As already said, in the control system according to the invention, the IR spectrophotometer 4 can be used not only for the purposes of an optimization of the fuel injection, but also for the purposes of optimization of the operation of any further electronic-control device associated to the internal-combustion engine.

Figure 5:
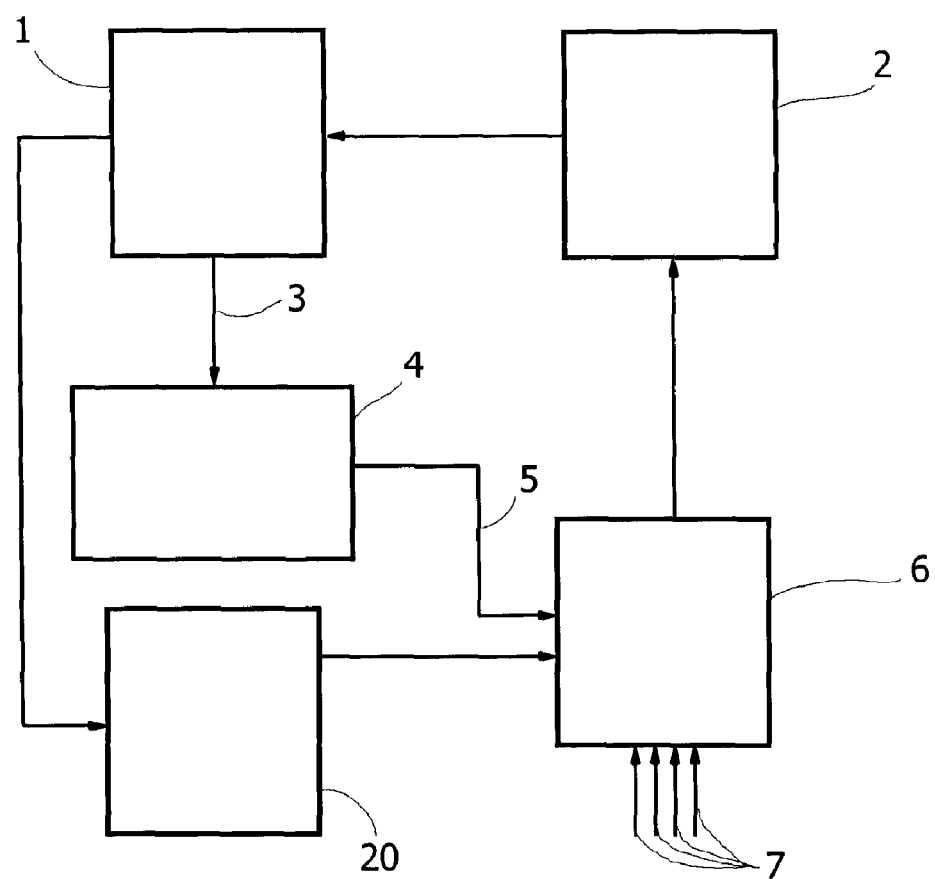
FIGS. 5 and 6 are variants of the control system of FIG. 1.

FIG. 5 illustrates a preferred scheme of embodiment of the control system according to the invention in the case of a petrol engine. In this case, the spectrophotometer 4 is used in addition to a sensor (lambda sensor) 20, which is in itself known, designed to detect the amount of oxygen present in the exhaust gases. The spectrophotometer 4 is designed to detect the unburnt hydrocarbons and the carbon monoxide present in the exhaust gases. This function is important for detecting immediately possible cases of misfiring of one or more cylinders of the engine. Furthermore, the information coming from the spectrophotometer 4 is particularly useful in the first instants after ignition of the engine, in so far as, in this period, the sensor 20 is not able to operate, since it has not yet reached its operating temperature.

Figure 6:
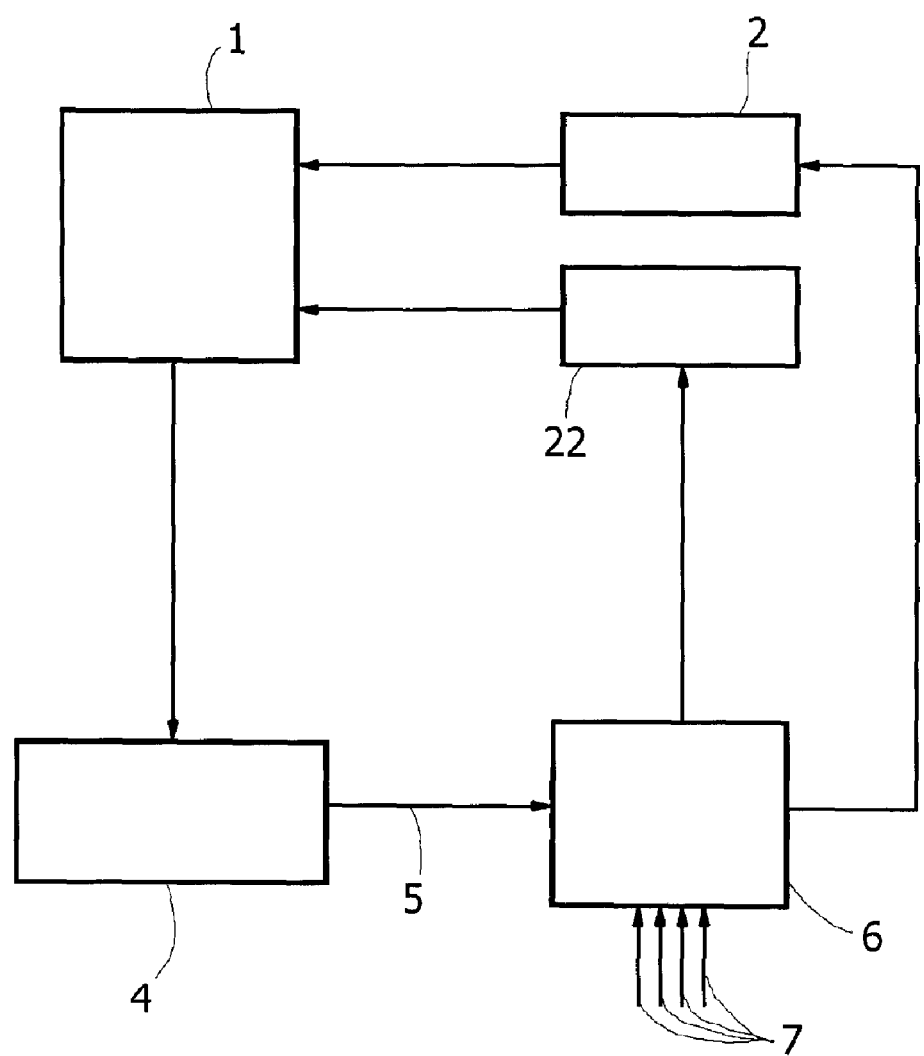

FIG. 6 illustrates a preferred scheme of embodiment in the case of a diesel engine, provided with a system 22, which is in itself of a known type, for recirculation of the unburnt gases in the combustion chamber (EGR). Experience shows that an excellent result in abatement both of particulate matter and of $NO_x$ can be obtained by appropriately regulating the EGR function. However, said mode of procedure presupposes the use of sensor means for very fast detection of the $NO_x$, as is precisely the case of the spectrophotometer 4 that is designed for said function.

Of course, without prejudice the principle of the invention, the details of construction and the embodiments may vary widely with respect to what is described and illustrated herein purely by way of example, without thereby departing from the scope of the present invention.

What is claimed is:

1. A control system for controlling operation of an internal-combustion engine of a motor vehicle, comprising: one or more electronic control devices which affect running of the engine; sensor means for detecting the composition of the exhaust gases of the engine; and an electronic control unit which controls the operation of said electronic devices according to the signals at output from said sensor means, said control system being wherein said sensor means comprise an IR spectrophotometer on board the motor vehicle, wherein the IR spectrophotometer comprises: a light source; a separator element for separating the light beam emitted by the source into the components corresponding to the different wavelengths; sensor means designed to receive the radiation coming from the separator element and to emit at output electrical signals indicating the wavelengths of the radiation received, in which the aforesaid electrostatic micro-shutters are set between said separator element and said sensor means, said sensor means being formed by a single photodiode, said spectrophotometer further comprising an optical element for converging the radiation at output from the electrostatic micro-shutters onto the aforesaid single photodiode, said electrostatic-shutter means being controlled so as to select each time a single wavelength to be analyzed.

2. The control system according to claim 1, wherein said electrostatic micro-shutters are arranged in a matrix array in a plane perpendicular to the direction of the light, and each one comprises a petal having one end fixed on top of a substrate and designed to adhere by electrostatic effect to said substrate when a potential difference is applied between a conductor film functioning as electrode associated to said petal and a conductor film functioning as electrode associated to said substrate.

3. The control system according to claim 1, wherein there are provided optical-fiber guide means associated to each cylinder of the engine in order to enable detection of the composition of the gases present in the combustion chamber of each cylinder of the engine.

* * * * *